May 19, 1931.  H. H. WERMINE  1,805,649
CHRISTMAS TREE STAND
Filed Feb. 14, 1927   2 Sheets-Sheet 1
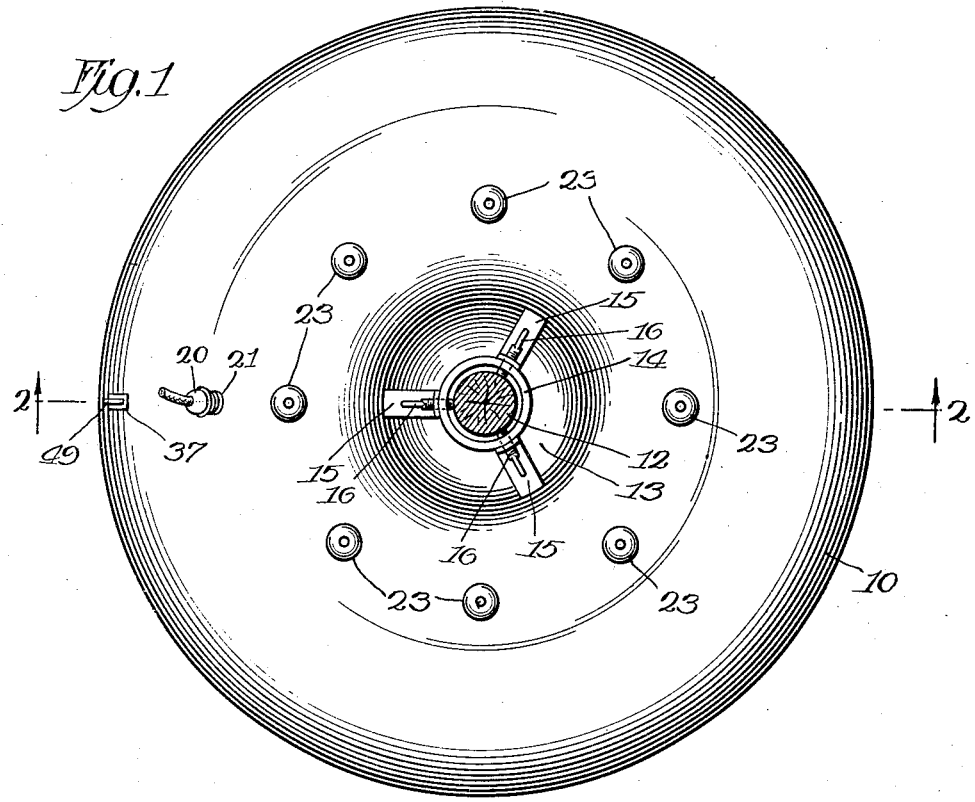
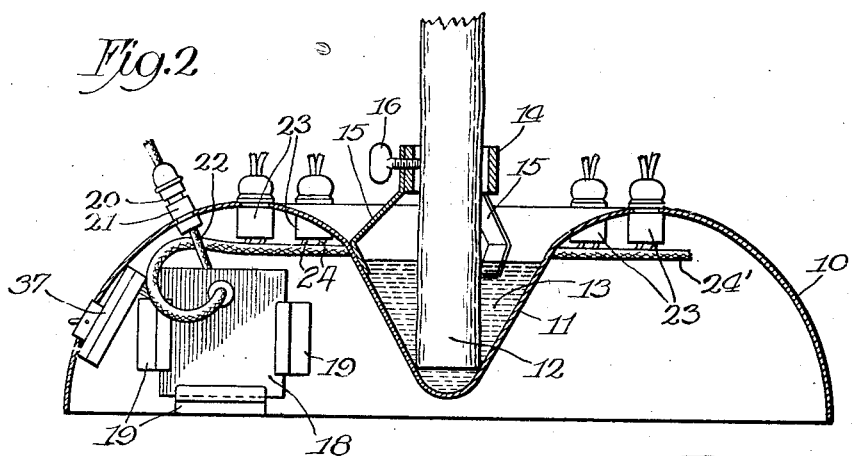
Inventor:
Hugo H. Wermine
By Fisher, Soule, Clapp & Soans
Attys May 19, 1931.  H. H. WERMINE  1,805,649
CHRISTMAS TREE STAND
Filed Feb. 14, 1927   2 Sheets-Sheet 2

Inventor:
Hugo H. Wermine
By Fisher, Jowl, Clapp + Soans
Attys

Patented May 19, 1931

1,805,649

UNITED STATES PATENT OFFICE

HUGO H. WERMINE, OF VILLA PARK, ILLINOIS, ASSIGNOR TO BELDEN MANUFACTURING COMPANY, OF CHICAGO, ILLINOIS, A CORPORATION OF ILLINOIS

CHRISTMAS TREE STAND

Application filed February 14, 1927. Serial No. 167,938.

This invention relates to Christmas tree stands such as are provided for supporting Christmas trees in upright position so as to facilitate decoration and exhibition thereof.

The principal object of the invention is to provide a stand having incorporated therein: means for conveniently connecting one or more strings of Christmas tree lights to an electric current supply line; means for supplying a low potential electric current to a string of lights requiring a current of lower voltage than that of the supply line; means for preventing unintentional connection of the tree lights to a high potential line; and means for selectively flashing or continuously lighting some of the lights.

Further objects of the invention are: to provide a stand capable of rigidly supporting a tree of relatively large size; to provide a stand which is adjustable and capable of supporting trees of a comparatively large range of sizes; to provide a stand having means for supplying water or other life sustaining fluid or material to the tree; and to provide a stand which may be manufactured from sheet metal with great facility and economy.

Other objects and advantages of the invention will appear by reference to the following specification and accompanying drawings illustrating a selected embodiment of the invention and in which:

Fig. 1 is a plan.

Fig. 2 is a section on the line 2—2 of Fig. 1.

Figure 5:
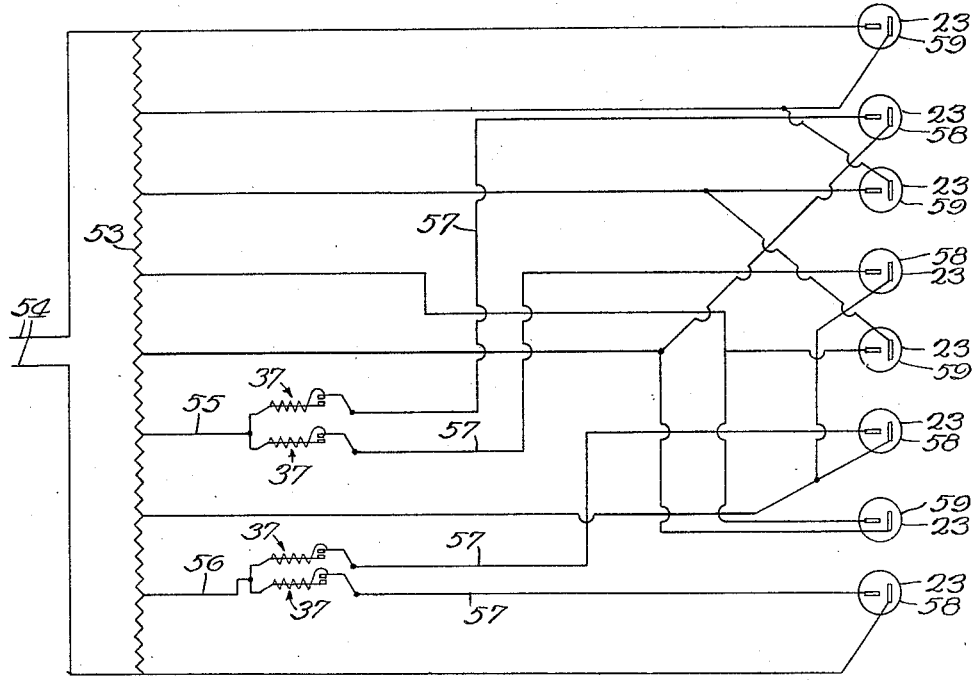
Fig. 5 is a wiring diagram of a transformer and tree light connections.

Referring now to the drawings, I have indicated in Figs. 1 and 2, a base consisting of an inverted cup-shaped or bowl-like structure 10 of sheet metal of suitable gauge to form a rigid and strong stand. A central portion of the bowl-like structure is depressed as indicated at 11 to form an inverted conical receptacle adapted to receive a filling of water or other life sustaining liquid or material as indicated at 13. The tree is held in upright position by means of an annular collar 14 which is supported by means of a plurality of bracket members 15 secured at their lower ends to the base 10 and at their upper ends to the said annular member 14. A set screw 16 threadedly engages a suitable aperture in each of the bracket members 15 and corresponding portion of the member 14 and is adjustable inwardly or outwardly to properly position the tree. By threading the set screws 16 through apertures extending through both the bracket members 15 and annular member 14, a longer, and consequently more secure bearing is provided for the set screws without the addition of special bosses or the like to the annular member 14. It will be apparent from an inspection of Fig. 2 of the drawing, that the tree is positioned in the stand at its lower end by engagement with the walls of the receptacle 11 near the apex of the inverted conical depression in such a way that practically the entire surface of the lower end of the tree is exposed to the contents of the receptacle whereby the said contents may effect a lengthening of the life of the tree with the greatest facility. It will be noted that the particular form of base 10 illustrated is such that it may conveniently and economically be manufactured from sheet metal either by stamping or spinning.

In accordance with usual custom, lights such as electric lights are placed in the tree at various points for purposes of ornamentation. The lights ordinarily used inside of homes and other buildings, are intended to operate on a lower voltage than is usually provided in domestic electric current supply lines, and accordingly a series of such lights, usually eight in number, are connected in series so as to be operable on a high potential current such as is provided. It has been found that such strings or series of lights are somewhat disadvantageous in that one of the lights frequently burns out and consequently results in the extinguishing of all of the series. It has been found to be somewhat of an inconvenient task to locate the burnt out light so that it may be replaced, In order to avoid these objections and disadvantages, I prefer to provide a string of lights for operation on a relatively low voltage, but connected in parallel so that if one lamp is burnt out, the others of the string will not be affected and it will consequently be a simple matter to replace the burnt out lamp.

Figures 3, 4:
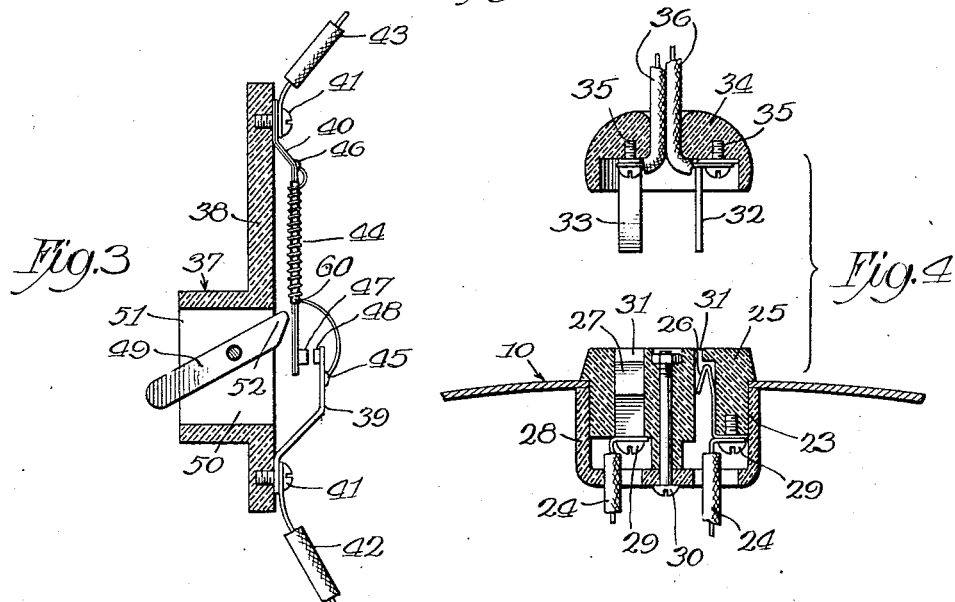
Fig. 3 is a detail section of the device for selectively flashing or continuously lighting some of the lights.
Fig. 4 is a detail section of a connector for preventing improper connection of the tree lights, the parts being shown separated.

For the purpose of supplying a low potential current to one or more strings of lights connected in parallel, from a high potential supply line, I provide a transformer indicated at 18, mounted on the inside of the base 10 by suitable means such as brackets 19. A separable connector 20 having its lower portion 21 fixedly mounted in the base and connected by means of a conductor 22 to the transformer is provided for the purpose of connecting the transformer to the high potential supply line. A plurality of socket members 23 are fixedly mounted in the base as shown in Figs. 1, 2 and 4, and are each connected by means of suitable conductors 24, to the low potential output line 24' of the transformer 18. The socket members 23 are preferably of a special type and differ from the usual wall or floor sockets provided in houses for convenience in connecting lamps and other electrically operated devices to the current supply line.

In the present instance, the socket members 23 comprise a body member 25 having a portion extending through a suitable aperture in the base 10, a pair of contact members 26 and 27 arranged at substantially right angles to each other in suitable recesses in the body 25 and the casing 28. The contact members 26 and 27 are fastened in place in the body 25 by means of screws 29 which threadedly engage the said body portion and which also serve as terminals or binding posts to which the conductor wires 24 are connected. The casing member 28 and the body portion 25 are connected together by means of a bolt and nut 30 which further serves to clamp the said body and casing portion on the base 10, as clearly illustrated in Fig. 4. The body member 25 is suitably apertured as at 31 to admit the prongs 32 and 33 of a plug member, which prongs are arranged at right angles relative to each other in accordance with the arrangement of the contact members 26 and 27. The said prongs 32 and 33 are mounted in a cap member 34 by means of screws 35 which threadedly engage suitable recesses in the cap member, and which screws serve as binding posts to receive conductors 36—36, which conductors are extended upwardly into the tree and to which conductors the desired lamps are connected. It will be apparent that a plug having its prongs arranged as above described, will not fit the usual socket provided in house wiring lines which ordinarily consists of a pair of flat contact members arranged either parallel to one another or in line with one another. It is also obvious that other forms of separable connectors may be provided which will not be connectible with the usual house wiring sockets.

I have found that by flashing some of the strings of lights, instead of continuously lighting them, that an exceptionally ornamental effect is obtained. In order that certain of the strings of lights may be flashed if desired, I provide a flasher 37 in one or more of the circuits between the transformer and the desired sockets 23. This flasher may consist of any desirable type of flasher but I prefer to provide one which may be controlled so as to selectively flash or continuously light the lights as desired.

In Fig. 3 I have illustrated a preferred embodiment of the flasher which comprises a base member 38 preferably of suitable insulating material, a contact member 39 and a bi-metal contact member 40. The contact members 39 and 40 are mounted on the base member 38 by suitable means such as screws 41, which also conveniently serve as binding posts, by which means the conductors 42 and 43 are connected to the said contact members. A coil of resistance wire, indicated at 44, is wound around the bi-metal contact member 40 and is permanently connected at one end to the contact member 39 as indicated at 45, and at its other end to the contact member 40 as indicated at 46, a wrapper 60 of suitable insulating material, such as asbestos, which material will not readily be affected by heat, being first applied to the contact member.

Current passing through the resistance wire 44 effects heating thereof, which heating, in turn, affects the bi-metal contact member so as to cause the latter to curl outwardly at its lower end until the contact points 47 and 48 on the contact members 40 and 39 respectively, are closed so as to establish a circuit therethrough, and under which conditions the heating of the resistance coil will stop until the temperature of the bi-metal contact member is reduced to such an extent that the contact member will restore itself to its original position with the contact points 47 and 48 separated. It will be understood that the bi-metal contact member is composed of two strips of metal, one of which strips is readily affected by heat and caused to curl in the direction desired, whereas the other of said strips is of such metal that it is not readily affected by heat and tends to retain its normal position against the action of the other strip.

A lever 49 is pivotally mounted in an aperture 50 in the base member 38, the base member being provided with an outwardly extending portion 51 to provide the necessary bearing portion and to protect the lever 49 from breakage. The lever 49 is arranged so that by swinging it on its pivot, the inner end 52 thereof will engage the adjacent end of the contact member 40, and force the latter into engagement with the contact member 39. The spring tendency of the contact member 40 to return to its normal position will cause the lever 49 to lock the contact member 40 in engagement with the contact member 39, since the engaging portion of the lever 52 will have passed beyond the center on which it is pivoted. Any suitable cover as indicated in Fig. 2 may be provided to enclose and protect the contact members 39 and 40 and resistance coil 44.

In Fig. 5 I have illustrated a wiring diagram for my improved Christmas tree stand wherein I have shown an auto-transformer used for providing a plurality of low potential current supply lines from a high potential supply line. In the diagram I have indicated a coil 53 connected at its opposite ends to a high potential current supply line indicated at 54. The coil 53 is tapped in the present instance at seven intermediate points so as to provide, with taps taken from the ends of the coils, eight independent low potential circuits, each terminating in one of the sockets 23. In two of the taps, as 55 and 56, I connect a pair of flashing devices such as described above, and each of the flashing devices is connected by means of a conductor 57 to one of the sockets 23. It will thus be seen that I provide four sockets indicated at 58 from which an intermittent current supply may be had for effecting flashing of lights connected thereto and that four sockets, 59, are provided from which a continuous current may be had for continuously lighting such lights as are connected thereto. It will be further noted that by dividing the taps 55 and 56 into two separate conductors, each having a flashing device included in its circuit, I provide a plurality of intermittent current circuits which will be effective to flash lights connected thereto, entirely independently of each other. By this means I avoid a monotonous regular flashing of lights. I prefer to provide the above described form of auto transformer for use with my Christmas tree stand, partly because of its low cost of construction, its efficiency as compared with other types, and because of the fact that a transformer of this type having the ability to furnish sufficient current to light as many as eight strings of lights of eight lights each, may be made relatively small in size and therefore conveniently concealed within the base or inverted cup-shaped member 10.

I am aware that various changes in the form, construction, and proportion of parts as well as in the arrangement thereof may be made without departing from the spirit of the invention, the scope of which should be determined by reference to the following claims which should be construed as broadly as possible consistent with the state of the art.

I claim as my invention:

1. A stand of the class described comprising an inverted, generally bowl shaped base formed from a single sheet of material, said sheet having a centrally disposed part depressed so as to form a receptacle for receiving and positioning the lower end of a Christmas tree or the like in the base, a marginal portion of said sheet, spaced from the receptacle, being turned downwardly to form a support for the receptacle, and means carried by said base for engaging the trunk of the tree at a point spaced upwardly from its lower end for maintaining the tree in upright position.

2. A stand of the class described comprising an inverted, generally bowl shaped base formed from a single sheet of material, said sheet having a centrally disposed portion depressed to form a receptacle for receiving the lower end of a Christmas tree or the like, and a marginal portion of said sheet being turned downwardly so as to engage a floor or other support at a point spaced from the receptacle, thereby to maintain the receptacle in upright position, said downwardly turned portion forming with the wall of the receptacle an enclosure for receiving and concealing from view, certain desired devices, and means secured to said base adjacent said receptacle for engaging the lower portion of a tree for rigidly supporting the same.

3. A stand of the class described comprising a one piece, circular, inverted, bowl-shaped member having a central portion of its top depressed to form an inverted, substantially conical-shaped receptacle adapted to receive and position the lower end of a Christmas tree or the like, substantially centrally of the stand, the rim portion of said inverted bowl-shaped member being substantially coaxial with said depressed portion and extending downwardly below the bottom of the latter for engaging the floor or other surface, and means for engaging a portion of the tree at a point spaced upwardly from the lower end thereof to hold the tree upright.

HUGO H. WERMINE.